(12) United States Patent
Song et al.

(10) Patent No.: US 10,917,551 B2
(45) Date of Patent: Feb. 9, 2021

(54) INTERACTIVE PHOTOGRAPHY USING TWO OR MORE DEVICES

(71) Applicant: International Business Machines Corporation, Armonk, NY (US)

(72) Inventors: Nan Song, Shanghai (CN); Xiao Xia Mao, Shanghai (CN); Ya Qing Chen, Shanghai (CN); Yi Chen Zhang, Shanghai (CN); Wen Wen Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/136,369

(22) Filed: Sep. 20, 2018

(65) Prior Publication Data

US 2020/0099838 A1    Mar. 26, 2020

(51) Int. Cl.
*H04N 5/225*    (2006.01)
*G06K 9/00*    (2006.01)

(52) U.S. Cl.
CPC ....... *H04N 5/2258* (2013.01); *G06K 9/00671* (2013.01)

(58) Field of Classification Search
CPC .... H04N 1/00137; H04N 1/164; H04N 1/167; H04N 2201/0084; G06K 9/00671; G06K 17/0022; G06K 15/1867
See application file for complete search history.

(56) References Cited

U.S. PATENT DOCUMENTS

| 8,693,807 | B1 | 4/2014 | Gossweiler, III |
| 9,100,587 | B2 | 8/2015 | Richardson |
| 2013/0235222 | A1 | 9/2013 | Karn |
| 2014/0009632 | A1 | 1/2014 | Glover |
| 2014/0109231 | A1* | 4/2014 | Takaoka .................. G06F 21/60 726/26 |
| 2014/0184829 | A1 | 7/2014 | Li |

(Continued)

FOREIGN PATENT DOCUMENTS

| CN | 103297660 A | 9/2013 |
| CN | 104572830 A | 4/2015 |

OTHER PUBLICATIONS

"A mechanism to help the photographer capture the scene preferred by the photographed", An IP.com Prior Art Database Technical Disclosure, Disclosed Anonymously, IP.com No. IPCOM000248726D, IP.com Electronic Publication Date: Dec. 30, 2016, 8 pages.

(Continued)

*Primary Examiner* — Wen W Huang
(74) *Attorney, Agent, or Firm* — Robert J. Shatto

(57) ABSTRACT

A method for interactive photography performed by a device, a device for interactive photography, and a computer program product for interactive photography are disclosed. An image is captured by a first device used by a first user to photograph a second user and the image received at a device for interactive photography. An adjustment input from the second user to adjust the image is received. An adjusted image is generated at the device for interactive photography based on the received adjustment input to the received image. The adjusted image is sent to the first device as adjustment information, for use in photographing the second user.

18 Claims, 10 Drawing Sheets

(56) References Cited

U.S. PATENT DOCUMENTS

| | | | |
|---|---|---|---|
| 2016/0112633 A1* | 4/2016 | Hara | H04N 5/23293 |
| | | | 348/333.02 |
| 2017/0237940 A1* | 8/2017 | Chaney | H04N 13/383 |
| | | | 348/14.07 |
| 2019/0318076 A1* | 10/2019 | Chun | G06F 21/36 |

OTHER PUBLICATIONS

"Virtual Photography", An IP.com Prior Art Database Technical Disclosure, Disclosed Anonymously, IP.com No. IPCOM000219492D, IP.com Electronic Publication Date: Jul. 3, 2012, 4 pages.

Mell et al., "The NIST Definition of Cloud Computing", National Institute of Standards and Technology, Special Publication 800-145, Sep. 2011, 7 pages.

* cited by examiner

INTERACTIVE PHOTOGRAPHY USING TWO OR MORE DEVICES

BACKGROUND

The present disclosure relates to data processing and communicating technologies, and more specifically, to a method for interactive photography performed by a device, a device for interactive photography, and a computer program product for interactive photography.

People often want to take great photos of themselves, for example, to share with friends or to help memorialize happy or important moments. When being photographed, a person may want to choose good scenes and to use his/her own judgement about how to compose the whole photo. Currently, people can use selfie-sticks to take photos of themselves, but the sticks are limited in length and range. Alternatively, tripods can also be used for pictures of oneself (commonly known as "selfies"), but users often cannot see themselves in the scenes or frames when using tripods.

Sometimes, a person may ask another person to take photos for him/her. However, it is not easy to take satisfying photos when the photos are taken by others. Since the photographed person cannot see or preview the photo being taken, he/she does not know whether the photo is good or not until he/she sees the finished product. In order to have a satisfactory photo, the photographed person may have to go back and forth for several times to check the photos and communicate with the photographer about how to make specific adjustments. It can take effort, communication, and reworks to get a single photo that the photographed person may be satisfied with. Also, it may be difficult or impossible to find a photographer with both skills and patience. Even when the photo is not satisfying, people may feel reluctant or troubled to ask for another favor. As a result, they may miss opportunities for good photos.

SUMMARY

According to an embodiment of the present disclosure, there is provided a method for interactive photography. In the method, an image is captured by a first device used by a first user to photograph a second user and the image is received at a device for interactive photography. An adjustment input from the second user to adjust the image is received. Then, an adjusted image is generated at the device for interactive photography based on the received adjustment input to the received image. Then, the adjusted image is sent to the first device as adjustment information, for use in photographing the second user.

According to another embodiment of the present disclosure, there is provided a device for interactive photography. The device for interactive photography comprises one or more processors, a memory coupled to at least one of the processors, and a set of computer program instructions stored in the memory and executed by at least one of the processors in order to perform actions of: receiving, at the device for interactive photography, an image captured by a first device used by a first user to photograph a second user; receiving an adjustment input at the device for interactive photography from the second user to adjust the image; generating an adjusted image based on the received adjustment input to the received image; and sending the adjusted image to the first device as adjustment information, for use in photographing the second user.

According to another embodiment of the present disclosure, there is provided a computer program product for interactive photography performed by a device for interactive photography, the computer program product comprising a computer readable storage medium having program instructions embodied therewith, the program instructions being executable by a computer to cause the computer to: receive, at the device for interactive photography, an image captured by a first device used by a first user to photograph a second user; receive an adjustment input at the device for interactive photography from the second user to adjust the image; generate an adjusted image based on the received adjustment input to the received image; and send the adjusted image to the first device as adjustment information, for use in photographing the second user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the accompanying figures, advantages of the present disclosure will become more apparent. Use of the same reference numeral generally refers to the same components in the embodiments of the present disclosure.

Figure 1:
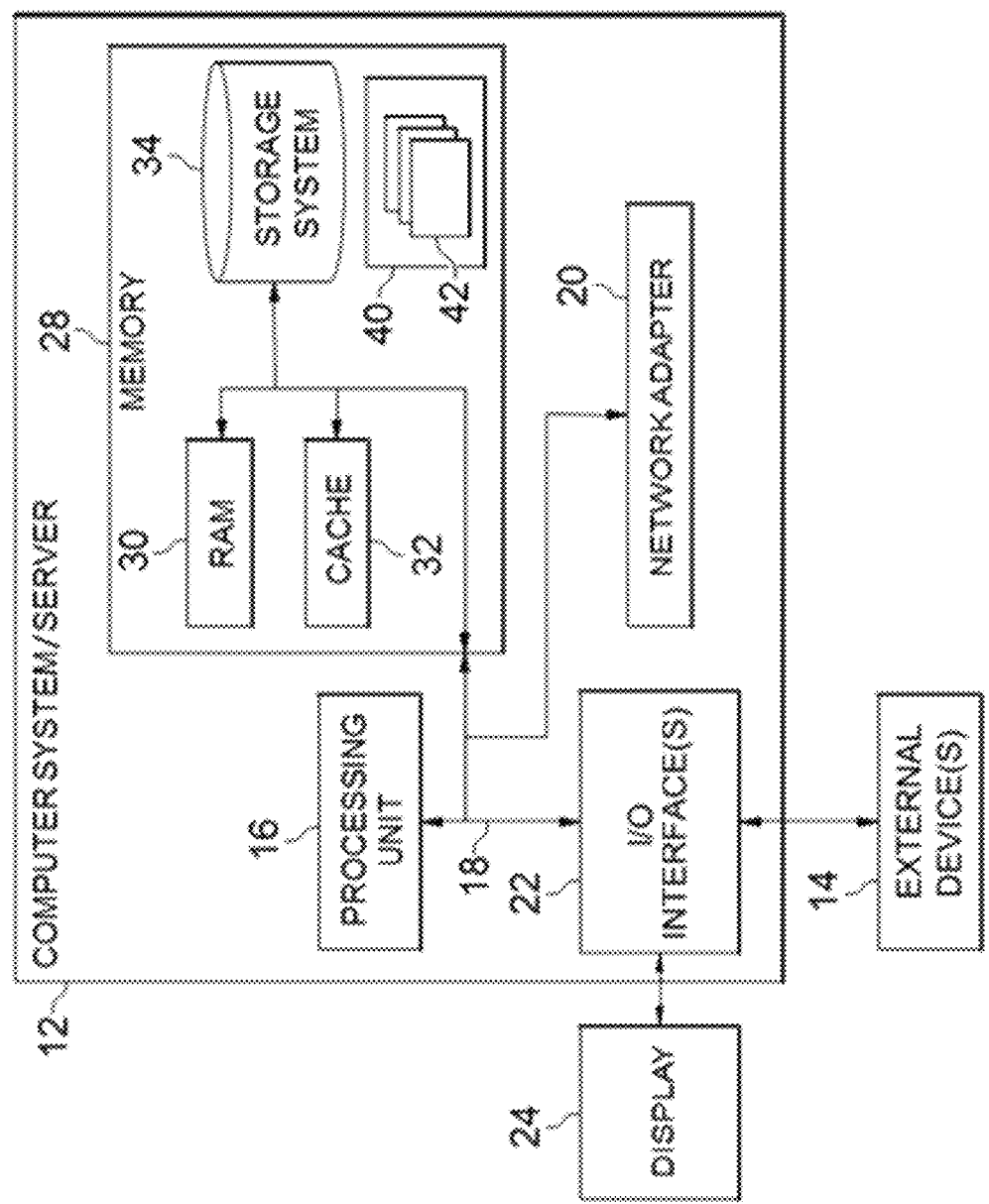
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node 10 is shown according to some embodiments of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10 there is a computer system/server 12. Computer system/server 12 can also take the form of a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, cell phones, tablet computers, personal digital assistants (PDA), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and Peripheral Component Interconnect Express (PCIe) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein, including performing method 400 and/or method 900 (described below regarding FIG. 4 and FIG. 9 respectively).

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
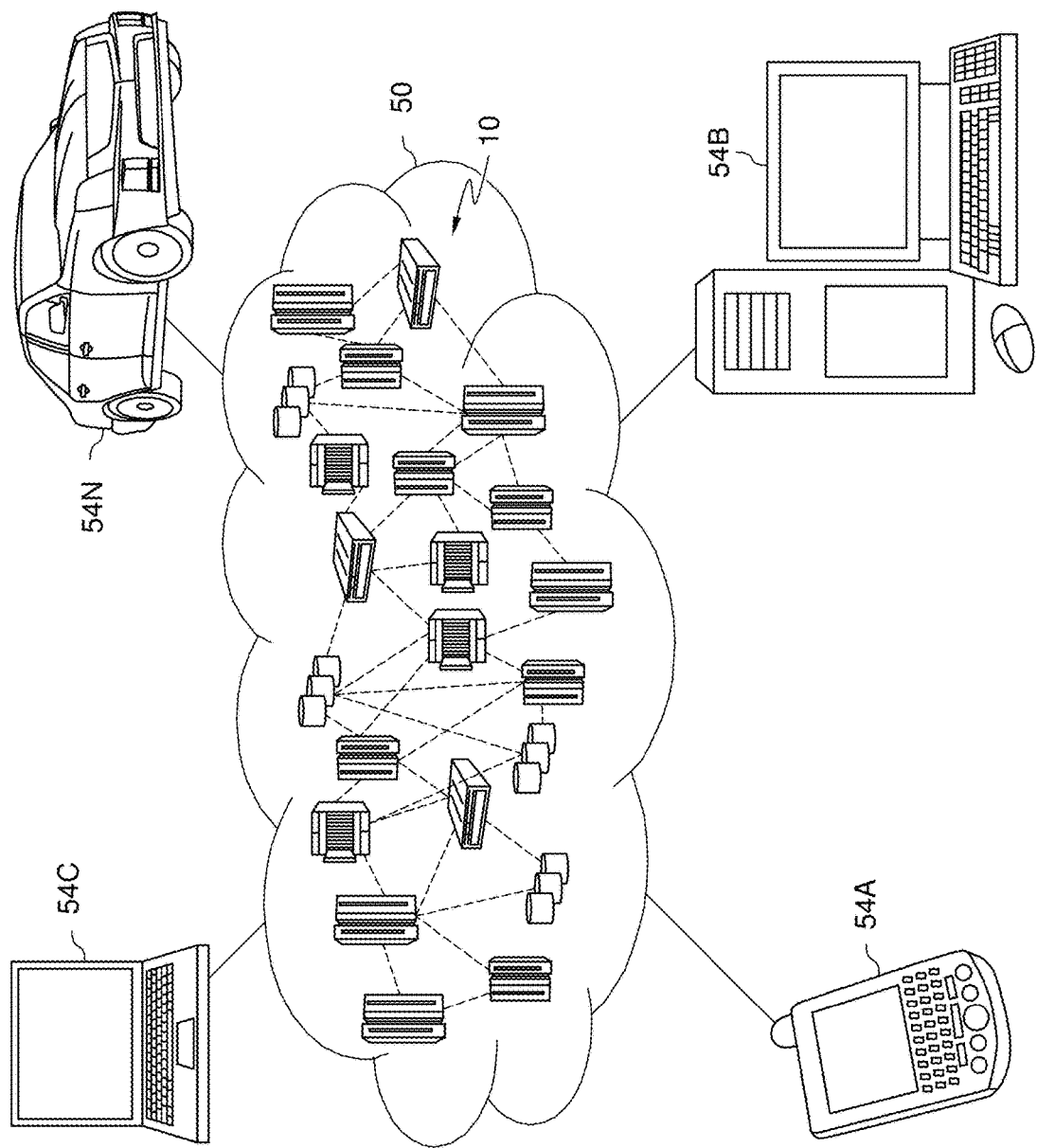
FIG. 2 depicts a cloud computing environment according to some embodiments of the present disclosure.

Referring now to FIG. 2, illustrative cloud computing environment 50 is depicted, according to some embodiments of the present disclosure. As shown, cloud computing environment 50 includes one or more cloud computing nodes 10 (such as depicted in FIG. 1) with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
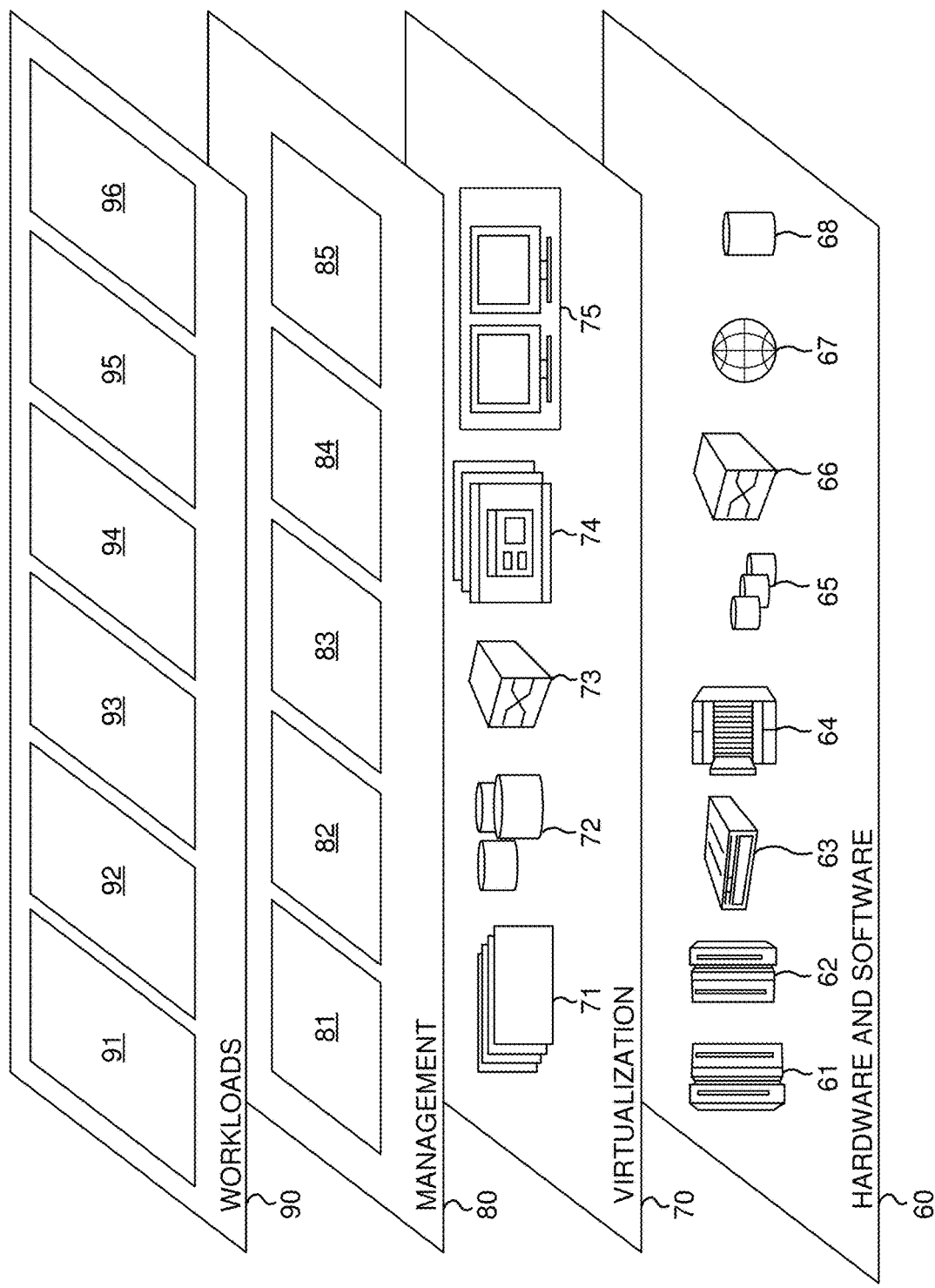
FIG. 3 depicts abstraction model layers according to some embodiments of the present disclosure.

Referring now to FIG. 3, a set of functional abstraction layers provided by cloud computing environment 50 (FIG. 2) is shown, according to some embodiments of the present disclosure. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive photography 96.

It is noted that, in addition to the cloud system described above, embodiments of the present disclosure can be implemented in any computer and network systems. Also, the present disclosure is not limited to the computer system described above, for example, with reference to FIG. 1.

Figure 4:
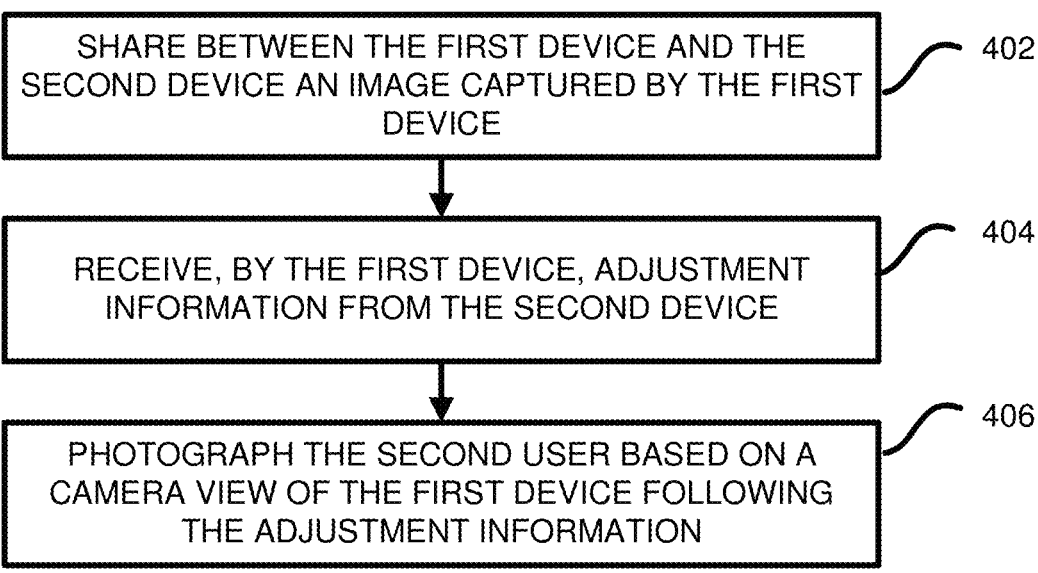
FIG. 4 depicts a schematic flowchart of a method for interactive photography according to some embodiments of the present disclosure.

With reference now to FIG. 4, shown is a schematic flowchart of method 400 for interactive photography according to some embodiments of the present disclosure. This method will be described in detail below in conjunction with the figures.

In method 400, a first user can use a first device to photograph a second user having a second device. The first device can be any kind of user equipment or computing device(s) including, but not limited to, smart phone, smart camera, PDA, tablet, laptop, pad, camera glasses, wearable devices or other devices, with which the first user can take and share photos. In some embodiments, the first device can be consistent with cloud computing node 10 as described with reference to FIG. 1. The second device can be any kind of user equipment or computing device(s) including, but not limited to, smart phone, smart camera, PDA, tablet, laptop, pad, wearable devices or other devices, with which an image of a photo to be taken (or a photo already taken) by the first device can be shared with the second user. In some embodiments, the second device can be consistent with cloud computing node 10 as described with reference to FIG. 1. While the second device may have a camera function as well, it is not necessary for method 400. The first and second devices can run with any kind of operating system including, but not limited to, Windows, Linux, UNIX, Android, iOS, and their variants. The second user may comprise one person or multiple persons to be photographed. In some embodiments, where multiple persons are to be photographed, the second device can instead be multiple devices where two or more of the multiple persons to be photographed are able to receive images from the first device and/or provide adjustment information to the first device.

As shown in FIG. 4, at block 402, an image captured by the first device may be shared between the first device and the second device. The first device and the second device may be operably connected through wireless communication, such as Wi-Fi, Bluetooth, infrared, or via a wireless system such as 3G, 4G, or 5G. As will be described below in detail, the first device has the capability of taking photos. For example, the first device may have a camera embedded or attached to it. The first user (the photographer) can use the first device to take a photo of the second user (the photographed). The image captured by the first device may then be sent to the second device via the wireless connection. Alternatively, the image may be uploaded to a cloud system by the first device. Then, the second device may download the image after obtaining authorization of the first user.

As will be described below, the sharing of images can be done continuously. For example, the first device can share, with the second device, whatever it captures with its camera. This can occur in real-time such that the second user, with the second device, can see what is going on with the first device's camera, which is supposed to take a photo of the second user. Alternatively, the first device can share, with the second device, one or more discrete images it captures. For example, the first user may take one or more temporary photos of the second user and share them with the second device. Thus, the second user can view them and instruct adjustments.

At block 404, the first device receives adjustment information from the second device. As will be described below, the second user's adjustment to the shared image may be, for example, adjustment of the amplification factor (zoom in or zoom out) of the shared image, adjustment of the size or the position of the captured second user in the shared image, or adjustment of the shooting angle. Many other possible types of adjustment information can exist in embodiments, including camera settings such as focus, aperture, shutter speed, flash, selection of camera modes (such as micro, macro, night, landscape, portrait, sport, etc.), red eye reduction, and other settings as appropriate for the first device's capabilities. The second user may use the second device to generate adjustment information based on the second user's adjustment to the shared image. The adjustment information may help the first user understand the second user's intention. Then, the adjustment information may be sent from the second device to the first device. In some embodiments of the present disclosure, the second device may generate an adjusted image based on the second user's adjustment to the shared image. The second device may send an adjusted image to the first device as the adjustment information.

At block 406, the first device may photograph the second user based on a camera view of the first device following the adjustment information. In some embodiments of the present disclosure, if the form of the adjustment information is an adjusted image, after the first device receives the adjusted image, it may determine whether the camera view of the first device matches the adjustment information. The first device may compare the camera view of itself and the adjusted image. The first device may determine the camera view matches the adjusted image when the difference between the both is lower than a threshold. Any existing and future techniques for comparing the camera view and the adjusted image can be used in the embodiment. If it is determined that the camera view of the first device matches the adjustment information, the first device may notify the first and second user of being ready to photograph the second user. Then the first device may photograph the second user automatically. Alternatively, it may wait until the first user to initiate picture taking manually, such as by press of a button on the first device. In some embodiments, the first device may display an adjusted image on its screen as a reference image. The first user may determine the time to press the shutter by himself/herself.

In embodiments where the adjustment information is not an adjusted image (such as if the adjustment information is an instruction to angle the camera 15 degrees to the right or other such information which is not an image, the first user can implement the adjustment information upon receiving it before the photographing occurs. In some embodiments, adjustment information received by the first device may cause the first device to make adjustments without action by the first user, such as the first device responding to a command by the second user to zoom in or otherwise adjust the image without needing the first user to physically reposition the first device.

It can be seen from the above description that, with the method for interactive photography as described above, people may take satisfying images. The communication between the photographer and the photographed person may be more effective than prior art methods of picture taking.

Figure 5B:
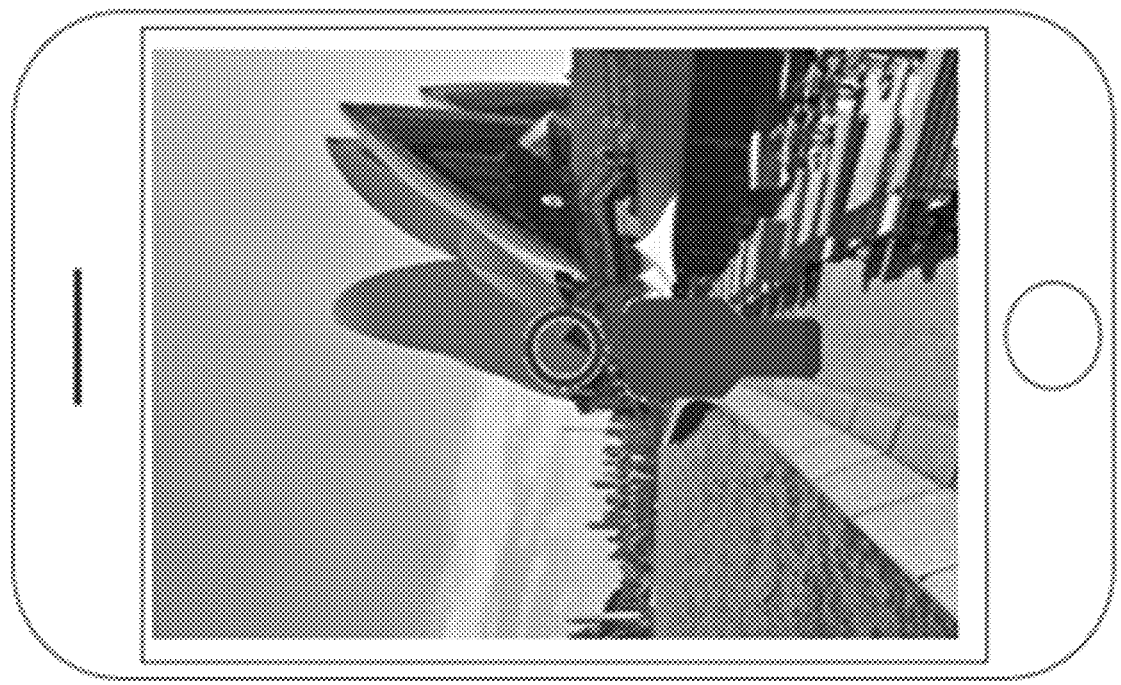
FIGS. 5A and 5B illustrate an embodiment in which the second user's adjustment is adjustment of the amplification factor of the shared image.
Figure 5A:
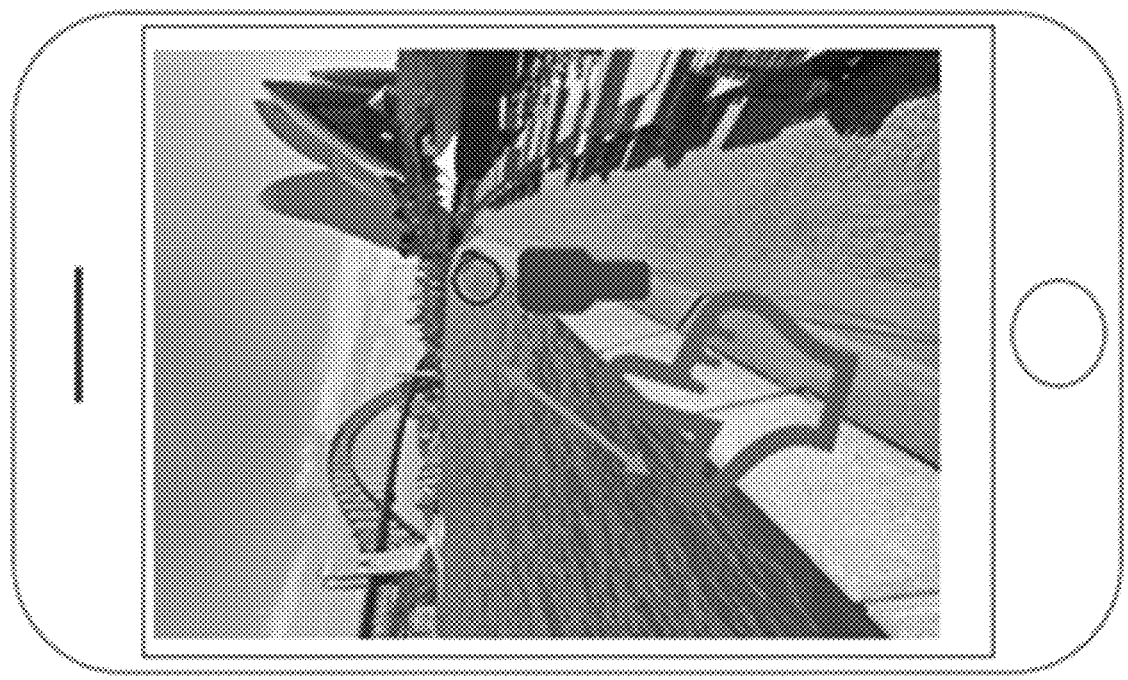

FIGS. 5A and 5B illustrate an embodiment in which the second user's adjustment is adjustment of the amplification factor of the shared image. FIG. 5A illustrates the second user's adjustment to the shared image. The second user may apply a gesture to the screen of the second device to instruct it to zoom in the shared image. The second device may generate an adjusted image based on the second user's adjustment to the shared image, as shown in FIG. 5B. In the example depicted in FIGS. 5A and 5B, the person to be photographed (second user) is also shown in a different location. Some adjustments of the amplification factor may not include such adjustment, while other adjustments of the shared image may include only such adjustment of location without adjustment of amplification factor. This concept is discussed in more detail in regard to FIGS. 7A and 7B. In another example, the second user may apply a gesture to the screen of the second device to instruct it to zoom out the shared image, which is not shown in the accompanying drawings.

Figure 6B:
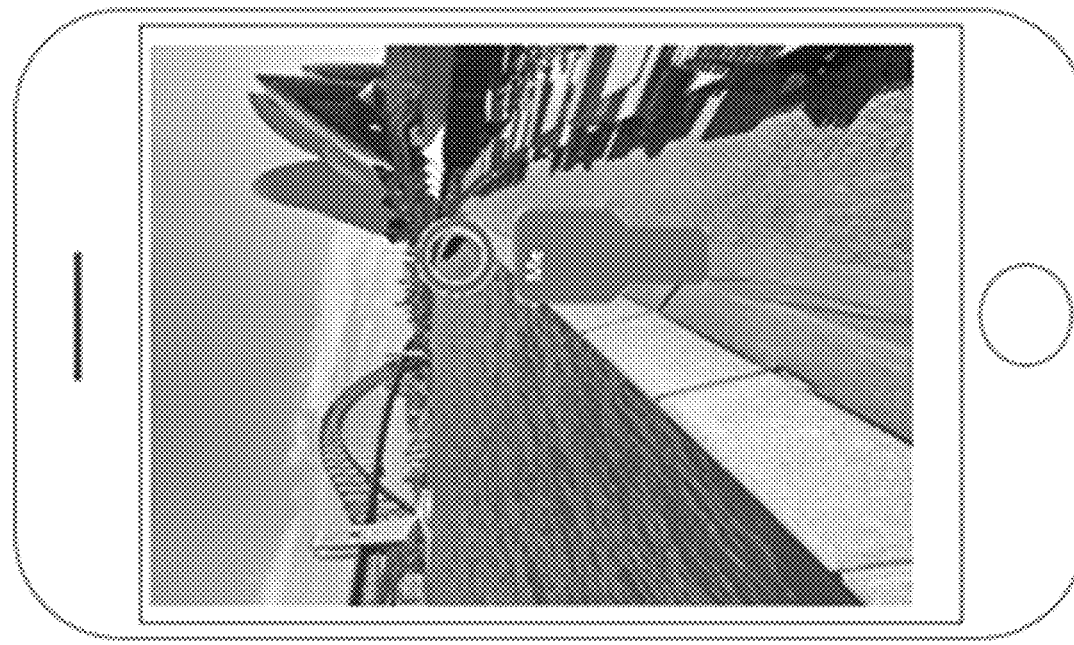
FIGS. 6A and 6B illustrate an embodiment in which the second user's adjustment is adjustment of the size of himself/herself in the shared image.
Figure 6A:

FIGS. 6A and 6B illustrate an embodiment in which the second user's adjustment is adjustment of the size of the captured second user in the shared image. In this case, the second user may instruct the second device, by e.g. pressing a button on the screen, to generate an icon to represent the second user. Alternatively, the second user may instruct the second device to recognize the second user in the shared image. For example, the second device may recognize the contour or figure of the second user in the shared image. Any existing or future technique for contour or figure recognition can be used in the embodiment. As an example, a person can be detected first, using one or more markers indicating people (e.g. skin and/or facial features), and then the position of the clothing can be identified from the location of the person's face. The recognition information of the clothing may correlate to the coloring present in a region predetermined in relative location to the detected face, taking into account the proportionality provided from the image. In this way, the contour or figure of the person may be recognized from a captured image.

Sometimes, additional information may be used for figure recognition. For example, objects may be recognized through various levels of recognition using a combination of sensors and algorithms. A depth distance or range can be obtained for each surface region in a plurality of surface regions that form a viewable surface of the object that is to be recognized. An identification feature of at least a portion of the object can be determined using the depth information for the plurality of surface regions. The object may be a person. Such additional information may be obtained by the first device and sent to the second device, which performs the figure recognition. Alternatively, the figure recognition may also be performed by the first device. Thus, when the second device receives the shared image, the second user (the person(s) to be photographed) has already been recognized in the image.

For the purposes of this disclosure, the second user's figure does not have to be recognized perfectly, because it is only used for illustrating the adjustment. In the context, the human figure labelled with "Me" in the accompanying drawings represents the second user's icon or figure.

FIG. 6A illustrates the second user's adjustment to the shared image. The second user may apply a gesture to the human figure on the screen of the second device to instruct the second device to zoom in the human figure. Then, the second device may generate an adjusted image by adding the icon representing the captured second user to the original shared image and changing the icon's size based the second user's adjustment, as shown in FIG. 6B. Alternatively, the second device may generate an adjusted image by recognizing the second user's figure in the shared image, and changing the figure's size based the second user's adjustment. In another example, the second user may apply a gesture to the human figure on the screen of the second device to instruct the second device to zoom out the human figure, which is not shown in the accompanying drawings. These adjustments of zooming in or out of a human figure without the background changing may occur by having the second user move toward or away from the first device until the desired level of zoom has been reached. One or more of the first device, second device, first user, or second user may provide an indication when the desired level of zoom has been reached for the second user to stop moving.

Figure 7A:
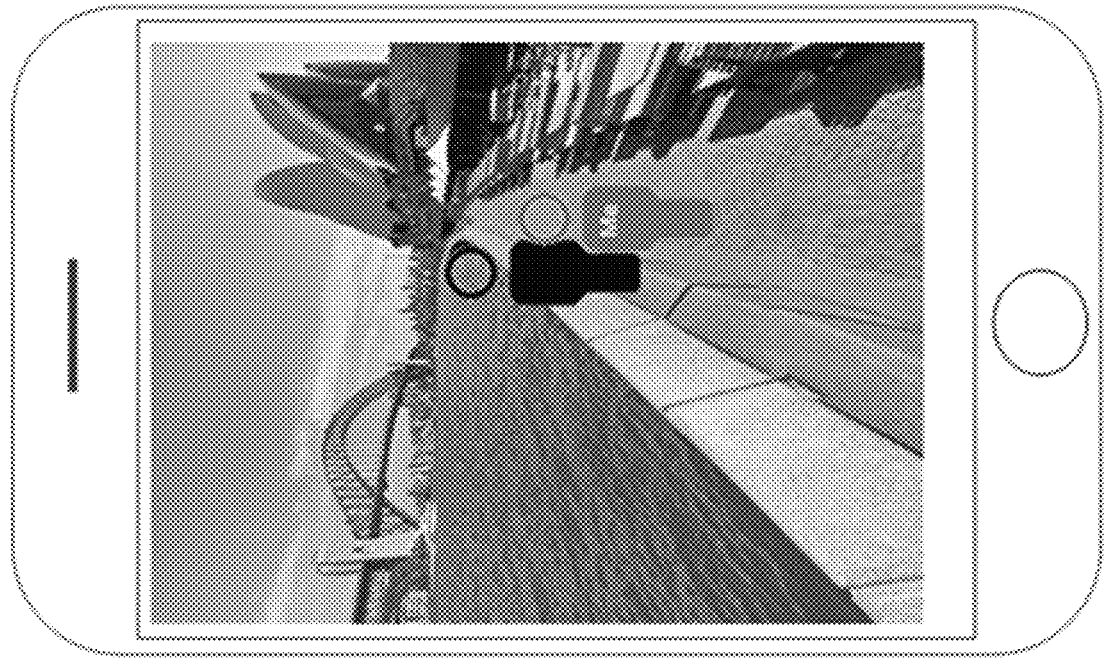
FIGS. 7A and 7B illustrate an embodiment in which the second user's adjustment is adjustment of the position of himself/herself in the shared image.
Figure 7B:
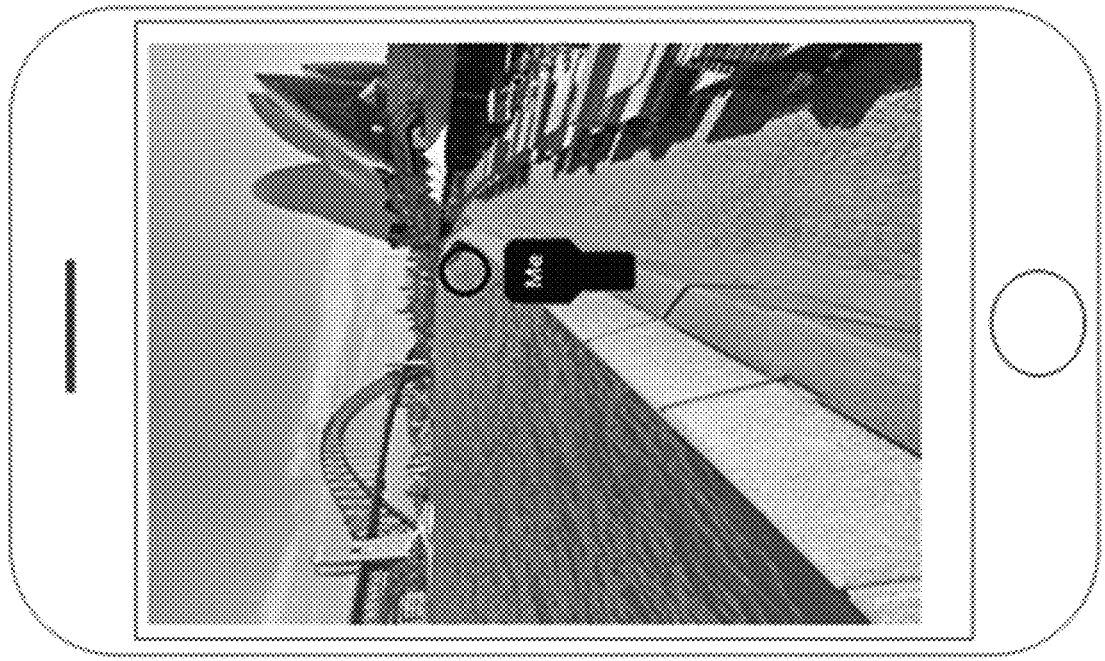

FIGS. 7A and 7B illustrate an embodiment in which the second user's adjustment is adjustment of the position of the captured second user in the shared image. In this case, the second user may instruct the second device to generate the human figure labelled with "Me", as described in the embodiment shown in FIGS. 6A and 6B. FIG. 7A illustrates the second user's initial position, to which an adjustment is desired. The second user may apply a gesture to the human figure to instruct the second device to move the human figure to a new position in the shared image. Then, the second device may generate an adjusted image by adding an icon representing the captured second user to the original shared image and changing the icon's position based the second user's adjustment, as shown in FIG. 7B. Alternatively, the second device may generate an adjusted image by recognizing the second user's figure in the shared image and changing the figure's position based the second user's adjustment.

Figure 8B:
FIGS. 8A and 8B illustrate an embodiment in which the second user's adjustment is adjustment of the shooting angle.
Figure 8A:
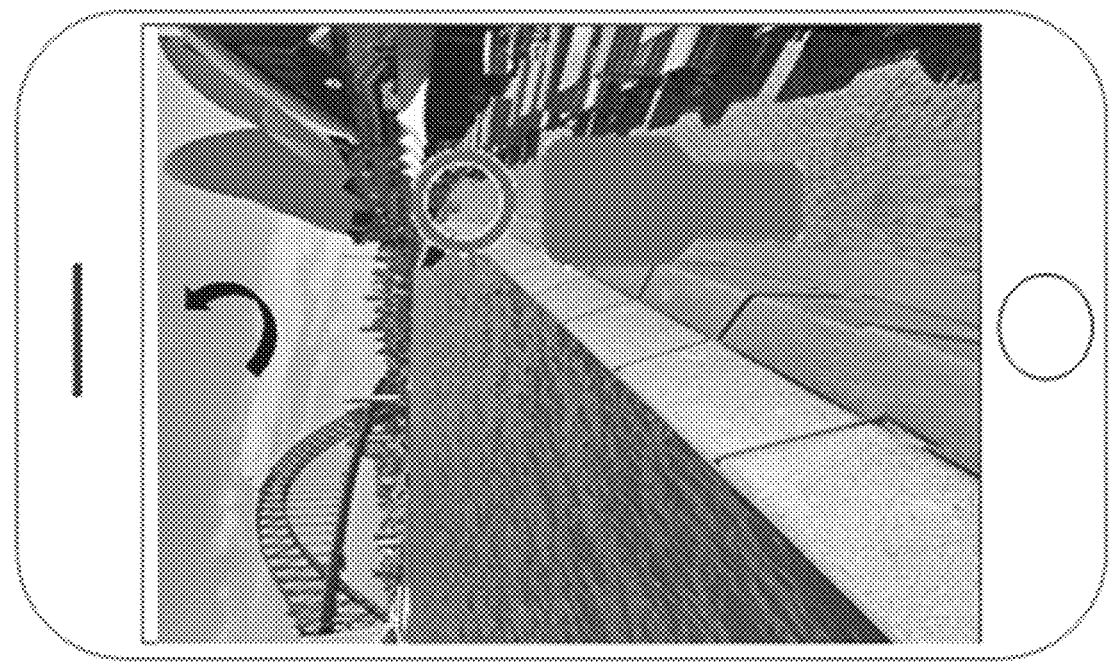

FIGS. 8A and 8B illustrate an embodiment in which the second user's adjustment is adjustment of the shooting angle. As shown in FIG. 8A, the second user may want to have more sky in the final image. Then the second user may instruct the second device to rotate the shooting angle (as shown by the curving arrow in FIG. 8A), by e.g. pressing a button on the screen or applying a gesture to the screen. Then, the second device may generate an adjusted image by predicting a scene according to the adjusted shooting angle, part of which may be outside the original shared image. Then the scene is reframed according to the adjusted shooting angle. As shown in FIG. 8B, the untaken portion of the sky on the upper side of the adjusted image can be predicted by the second device. Any existing and future techniques for predicting can be used in embodiments which utilize predictions of areas outside the original image. For example, existing apps, including Snapseed, have the function for extending an image through artificial intelligence (AI). As another example, Adobe™ has used Deep Fill technology for predicting. Deep Fill is powered by the Adobe Sensei technology which uses AI, machine learning, and deep learning. Deep Fill is trained using millions of real-world images. Deep Fill can use training images to predict image. Not all embodiments will use predictions for portions of an image which fall outside the scope of the original image. In some embodiments, a blank area or an area with an instruction to capture additional image content can be displayed instead.

Figure 9:
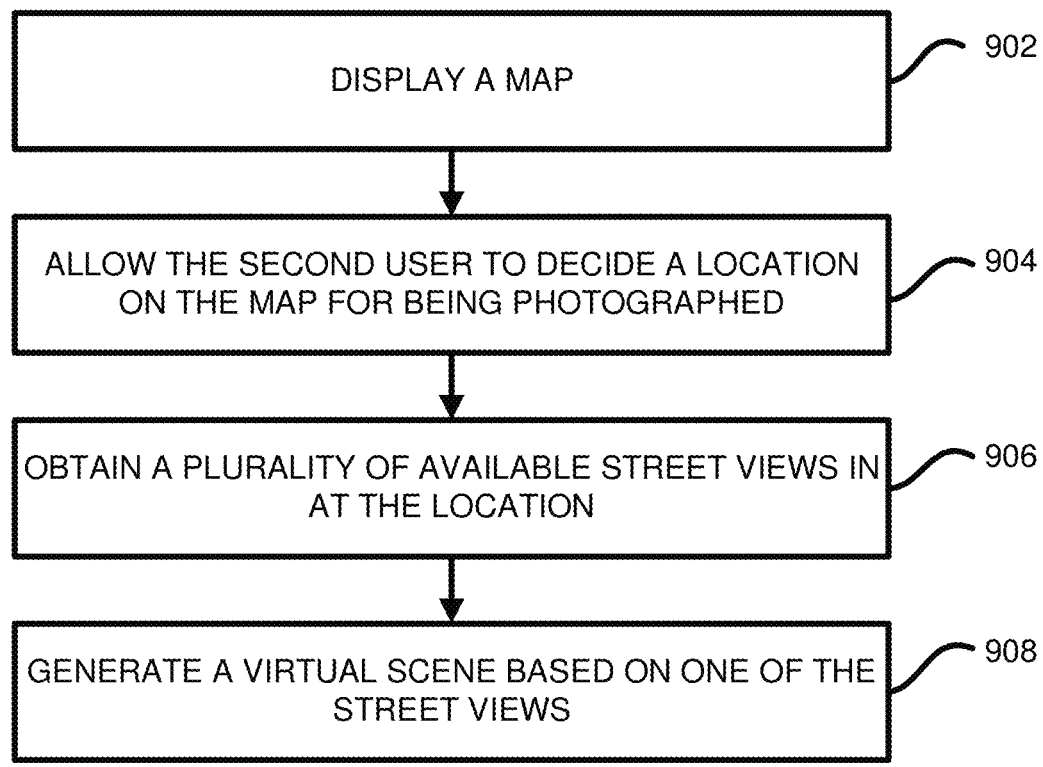
FIG. 9 depicts a schematic flowchart of a method for photography with street view auxiliary according to some embodiments of the present disclosure.

It should be noted that the second user's adjustment may be any one or any combination of the examples as shown from FIG. 5 to FIG. 8 FIG. 5A, 5B, 6A, 6B, 7A, 7B, 8A, or 8B, or other adjustments which may be applied to an image, without limitation to the specific examples described herein. With reference now to FIG. 9, shown is a schematic flowchart of method 900 for photography with street view auxiliary according to some embodiments of the present disclosure. This method will be described in detail below in conjunction with FIGS. 10A, 10B, and 10C, which illustrate an example embodiment for photography with street view auxiliary.

As shown in FIG. 9, at block 902, a map can be displayed on the first and/or second device. The map may be a map displaying surroundings near the first or second user's location. The location may be determined through localization and/or coordination of signals of a global positioning system (GPS). For example, when the first and second users are travelling around the Sydney Opera House, a map around the Sydney Opera House may be displayed. In another example, the map may display any location the first and second users would like to visit, which may be selected by one of the users by inputting instructions or performing a search on one of the devices. For example, the first and second users may be away from the Sydney Opera House, but they would like to visit it. They may use their devices to display the map around the Sydney Opera House. Any existing and future techniques for displaying electronic map can be used in the embodiment. An example map is depicted as shown in the upper part of FIG. 10A.

Figure 10A:
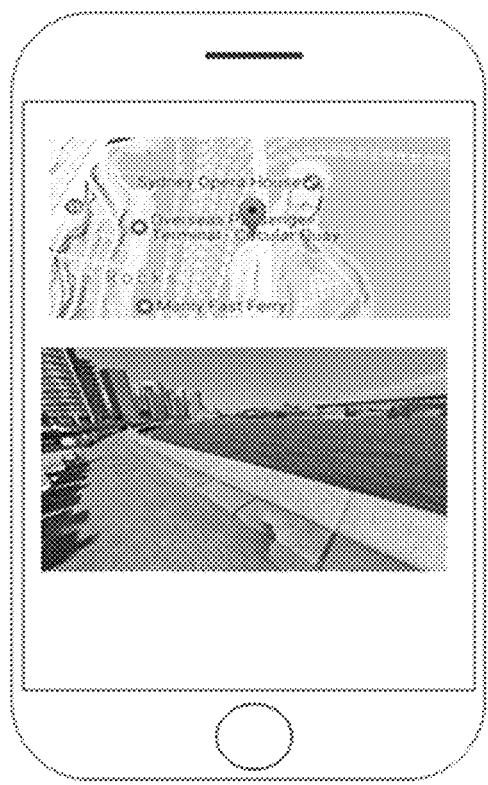
FIGS. 10A, 10B, and 10C illustrate an embodiment for photography with street view auxiliary.

At block 904, method 900 can allow the second user to decide a location on the map for where a photograph shall be taken. In another embodiment, the first user may be allowed to decide a location on the map for the second user to be photographed. The first user may use the first device to send the map with the decided location to the second device. For example, the first or second user may touch a point on the map to decide a location for the second user to be photographed. Continuing with the example of the Sydney Opera House, a location may be chosen to be very close to the Sydney Opera House such that the Sydney Opera House may occupy a major part of the captured image. Alternatively, as shown in FIG. 10A, the location may be further away from the Sydney Opera House such that the sea may be included in the captured image. In this example embodiment, after the location is decided, a street view may be displayed as shown in the lower part of FIG. 10A, such that it may help the first and/or second user check the location visually.

At block 906, a plurality of street views at the location may be obtained. The techniques for obtaining street views are known in the art. For example, street-level photographic images for locations along each street may be captured in advance. The plurality of street views may provide a 360° street view for the chosen location. The street-level photographic images may be stored in a database. When one of the users wants to see the street views at a specific location, the available street views in that location may be retrieved from the database. In some embodiments, the first user can obtain street views by positioning themselves at the desired location and taking a plurality of pictures to serve as the street views.

Figure 10B:
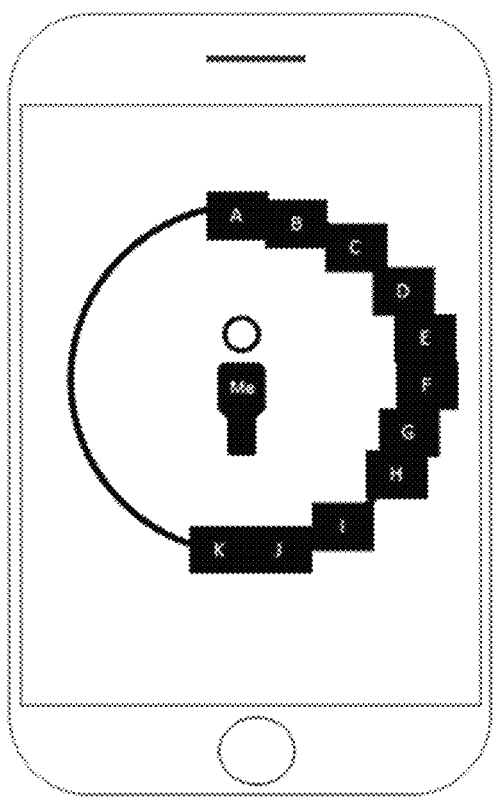
Figure 10C:
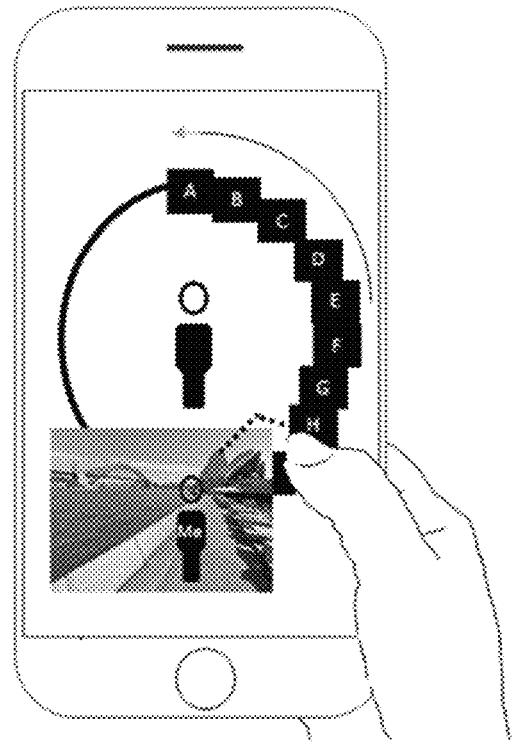

The plurality of street views correspond to a plurality of possible positions for photographing the second user, as shown in the example in FIG. 10B. The positions that the first user can stand in relative to the second user are shown as blocks labeled from A to K in FIG. 10B. Each adjacent position may have an angle of e.g. 30°. The portion of the circle's line without blocks indicates that this area is inaccessible because it may be the seaside.

The second device may obtain the street view at the second user's location by using the aforementioned technique. But, the street views at the second user's location can be slightly different from the street view at the first user's position. As shown in FIG. 10B, the first user's positions are arranged around the second user's location. Virtual perspectives from the first user's position or device may be generated to show a more precise scene. The techniques for generating virtual perspectives are known in the art. For example, street views from additional virtual perspectives may be produced from a stereo image having at least 2 perspectives. In this way, the street views at the first user's positions may be obtained. It is noted that any existing or future techniques for obtaining a street view for the photographer can be used in the embodiment.

At block 908, a virtual scene can be generated based on one of the street views. The virtual scene may show a representation of the second user being photographed by the first user at the corresponding position. In the embodiment, the virtual scene may comprise the corresponding street view and a human figure. The human figure may comprise an icon representing the second user or the second user's figure. The virtual scene may be displayed as shown in the lower part of FIG. 10C. In an example, a virtual scene may be generated when the first user's position is selected. In another example, a plurality of virtual scenes may be generated in advance. The second user may view the virtual scenes and choose one or more virtual scenes to use for taking one or more photographs.

In some embodiments, after the virtual scene is determined, the first device may recommend a path for the first user to take to reach a position for photographing the second user. The second device may recommend a path for the second user to take to reach a location for being photographed. This can take, for example, the form of a direction and a number of feet or meters to travel to reach the respective locations. This can be updated as the users travel using GPS or other sensor technology. When the first and second users arrive in their respective destinations, they can start taking photos. Alternatively, they may start taking photos whenever they want to, such as on the way to the determined destinations.

The above described method for photography with street view auxiliary can provide advantages to users who wish to plan and take good pictures. By viewing options of potential picture views before reaching a location, people may not need to walk back and forth and/or spend time physically locating their desired scene for photographing and thus may not be tired or exhausted after choosing a scene. This method may help the users feel happy, relaxed, and enjoy the picture taking experience more than using conventional means. These improvements and/or advantages are a non-exhaustive list of example advantages. Embodiments of the present disclosure exist which can contain none, some, or all of the aforementioned advantages and/or improvements.

The method for photography with street view auxiliary (method 900) may be used independently or may be used in conjunction with the method for interactive photography (method 400) as described above.

Another embodiment of the present disclosure can provide a first device for interactive photography (the first device can be consistent with cloud computing node 10 as described with reference to FIG. 1). The first device can be used by a first user to photograph a second user with a second device. The first device may comprise one or more processors, a memory coupled to at least one of the processors, and a set of computer program instructions stored in the memory and executed by at least one of the processors. The set of computer program instructions when executed perform the actions of sharing an image captured by the first device with the second device; receiving, from the second device, adjustment information based on the second user's adjustment to the shared image; and photographing the second user based on a camera view of the first device following the adjustment information.

Similarly, another embodiment of the disclosure can provide a second device for interactive photography (the second device can be consistent with cloud computing node 10 as described with reference to FIG. 1). The second device can be used by a second user who is photographed by a first user with a first device. The second device may comprise one or more processors, a memory coupled to at least one of the processors, and a set of computer program instructions stored in the memory and executed by at least one of the processors. The set of computer program instructions when executed perform the actions of receiving an image captured by the first device; generating an adjusted image or adjustment information based on the second user's adjustment to the received image; and sending the adjusted image to the first device as adjustment information.

Similarly, another embodiment of the disclosure can provide a second device for photography with street view auxiliary (the second device can be consistent with cloud computing node 10 as described with reference to FIG. 1). The second device may comprise one or more processors, a memory coupled to at least one of the processors, and a set of computer program instructions stored in the memory and executed by at least one of the processors. The set of computer program instructions when executed perform the actions of displaying a map; allowing the second user to decide a location on the map for being photographed; obtaining a plurality of street views at the location, wherein the plurality of street views correspond to a plurality of possible positions for photographing the second user; and generating a virtual scene based on one of the street views, wherein the virtual scene shows an anticipation of the second user being photographed by the first user at the corresponding position.

Similarly, another embodiment of the disclosure can provide a system for interactive photography. The system can comprise the aforementioned first device and any of the aforementioned second devices.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for interactive photography, the method comprising:
   receiving an image captured by a first device used by a first user to photograph a second user, the image received at a second device;
   receiving an adjustment input at the second device from the second user to adjust the image wherein the adjustment input comprises adjustment of size or position of a portion of the image corresponding to the second user in the received image;
   generating, at the second device, an adjusted image based on the received adjustment input to the received image and wherein generating the adjusted image further comprises:
      recognizing a figure of the second user in the received image; and
      changing the figure's size or position based on the second user's adjustment input; and
   sending the adjusted image to the first device as adjustment information, for use in photographing the second user.

2. The method of claim 1, wherein the adjustment input comprises any one or a combination of:
   adjustment of amplification factor of the received image;
   adjustment of size or position of a portion of the image corresponding to the second user in the received image; and
   adjustment of a shooting angle.

3. The method of claim 1, wherein the adjustment input comprises adjustment of size or position of a portion of the image corresponding to the second user in the received image, and wherein generating the adjusted image further comprises:
   adding an icon representing the second user to the received image; and
   changing the icon's size or position based on the second user's adjustment input.

4. The method of claim 1, wherein the adjustment input comprises adjustment of a shooting angle, and wherein generating the adjusted image further comprises:
   predicting a scene according to the adjustment of the shooting angle, a portion of the scene being outside an area depicted in the received image; and
   reframing the scene according to the adjustment of the shooting angle.

5. The method of claim 1 further comprising:
   displaying a map;
   prompting the second user to decide a location on the map to be photographed;
   obtaining a plurality of street views of the location, wherein the plurality of street views correspond to a plurality of possible positions for photographing the second user; and
   generating a virtual scene based on one of the street views, wherein the virtual scene shows a representation of the second user in the virtual scene at the corresponding position.

6. The method of claim 5, wherein the virtual scene comprises the street view and a human figure, wherein the human figure comprises an icon representing the second user or a figure of the second user.

7. The method of claim 5 further comprising:
   determining a position for the first user and a location for the second user based on the virtual scene.

8. A device for interactive photography comprising:
   one or more processors;
   a memory coupled to at least one of the processors;

a set of computer program instructions stored in the memory and executed by at least one of the processors in order to perform actions of:
- receiving, at the device for interactive photography, a map of a location near at least a first user;
- prompting a second user to decide a location on the map to be photographed;
- obtaining a plurality of street views of the location, wherein the plurality of street views correspond to a plurality of possible positions for photographing the second user;
- generating a virtual scene based on one of the street views, wherein the virtual scene shows a representation of the second user in the virtual scene at the corresponding position;
- determining a position for the first user and a location for the second user based on the virtual scene;
- recommending, to the first user, a path to reach the position;
- recommending, to the second user, a path to reach the location;
- receiving, at the device for interactive photography, an image captured by the first device used by the first user to photograph the second user;
- receiving an adjustment input at the device for interactive photography from the second user to adjust the image;
- generating an adjusted image based on the received adjustment input to the received image; and
- sending the adjusted image to the first device as adjustment information, for use in photographing the second user.

9. The device for interactive photography of claim 8, wherein the adjustment input comprises any one or a combination of:
- adjustment of amplification factor of the received image;
- adjustment of size or position of a portion of the image corresponding to the second user in the received image; and
- adjustment of a shooting angle.

10. The device for interactive photography of claim 8, wherein the adjustment input comprises adjustment of size or position of a portion of the image corresponding to the second user in the received image, and wherein the set of computer program instructions is executed by at least one of the processors in order to generate the adjusted image by:
- adding an icon representing the second user to the received image; and
- changing the icon's size or position based on the second user's adjustment.

11. The device for interactive photography of claim 8, wherein the adjustment input comprises adjustment of a shooting angle, and wherein the set of computer program instructions is executed by at least one of the processors in order to generate the adjusted image by:
- predicting a scene according to the adjustment of the shooting angle, a portion of the scene being outside an area depicted in the received image; and
- reframing the scene according to the adjustment of the shooting angle.

12. The device for interactive photography of claim 8, wherein the virtual scene comprises the street view and a human figure, wherein the human figure comprises an icon representing the second user or a figure of the second user.

13. A computer program product for interactive photography performed by a device for interactive photography, the computer program product comprising a computer readable storage medium having program instructions embodied therewith, the program instructions being executable by a device to cause the device to perform a method comprising:
- capturing, by a first device controlled by a first user, a first photographic image of a second user;
- transmitting, by the first device, the first photographic image of the second user to a second device that is associated with the second user;
- receiving, by the first device, adjustment information from the second device, the adjustment information including information pertaining to one or more modifications to the first photographic image requested by the second user, wherein the one or more modifications were inputted into the second device by the second user;
- receiving, by the first device, from the first user, a command to take a second photographic image of the second user;
- comparing, by the first device, a camera view of the first device to the received adjustment information; and
- capturing, by the first device, the second photographic image of the second user in response to the camera view satisfying the adjustment information.

14. The computer program product of claim 13, wherein the received adjustment information is an adjusted image, and wherein comparing the camera view of the first device to the received adjustment information comprises comparing the camera view of the first device to the adjusted image.

15. The computer program product of claim 13, the method further comprising determining that the camera view satisfies the adjustment information.

16. The computer program product of claim 15, wherein the received adjustment information is an adjusted image, and wherein determining that the camera view satisfies the adjustment information comprises:
- determining that a difference between the camera view and the adjusted image is less than a threshold.

17. The computer program product of claim 13, wherein capturing the second photographic image of the second user comprises:
- notifying the first and second users that the camera view satisfies the adjustment information; and
- capturing, automatically by the first device, the second photographic image of the second user.

18. The computer program product of claim 13, wherein the method further comprises:
- automatically adjusting, by the first device, in response to determining that the camera view of the first device does not satisfy the adjustment information, one or more attributes of the first device to cause the camera view of the first device to satisfy the adjustment information, wherein the capturing the second photographic image is performed after adjusting the one or more attributes of the first device, and
- wherein adjusting the one or more attributes comprises adjusting at least one of the group consisting of:
- an angle of the first device, a zoom of the first device, a focus of the first device, an aperture of the first device, a shutter speed of the first device, a flash setting of the first device, and a camera modes of the first device.

* * * * *